No. 675,064. Patented May 28, 1901.
A. DE LASKI.
VEHICLE TIRE.
(Application filed Oct. 5, 1900.)
(No Model.) 2 Sheets—Sheet 1.
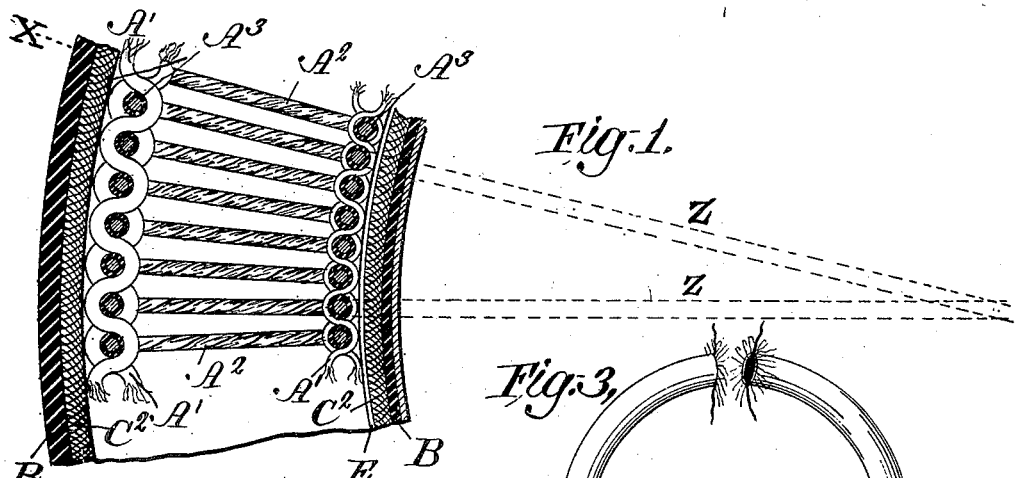
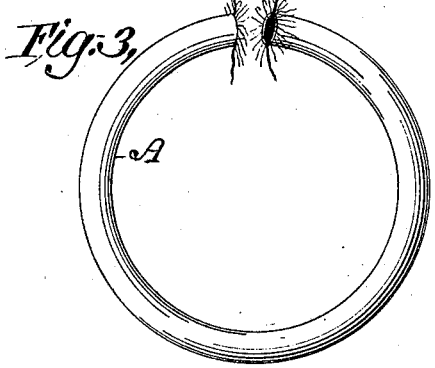
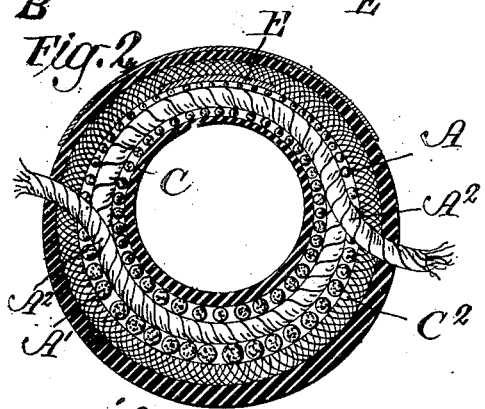
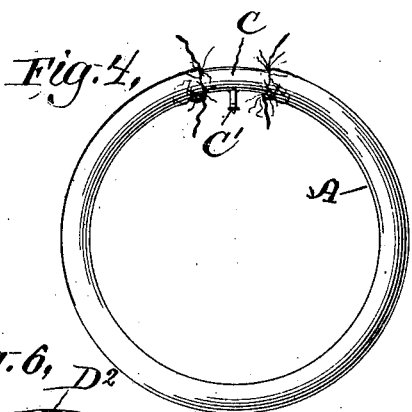
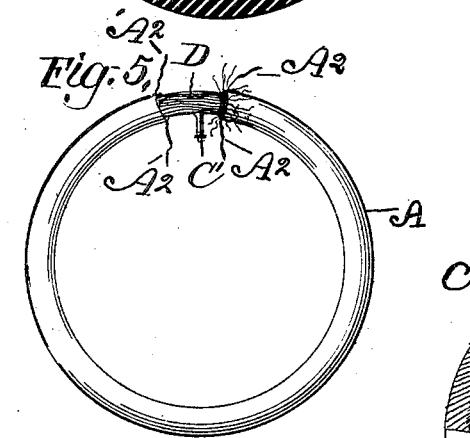
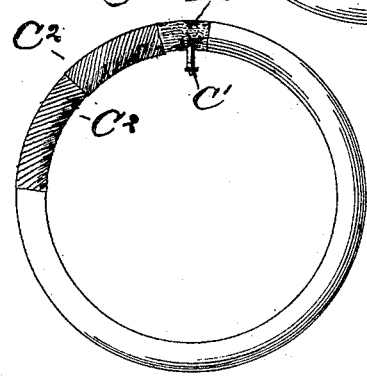
WITNESSES: INVENTOR No. 675,064. Patented May 28, 1901.
A. DE LASKI.
VEHICLE TIRE.
(Application filed Oct. 5, 1900.)
(No Model.) 2 Sheets—Sheet 2.
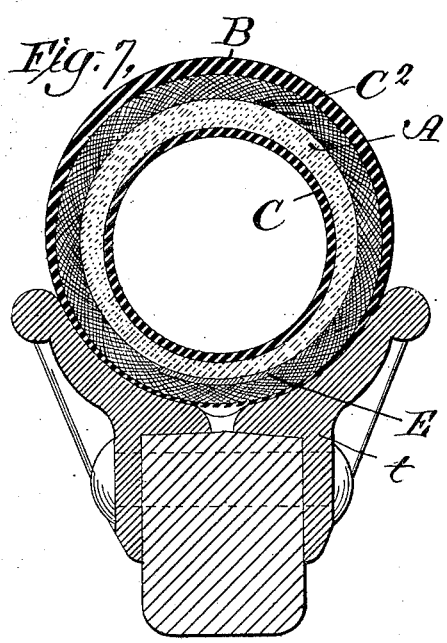
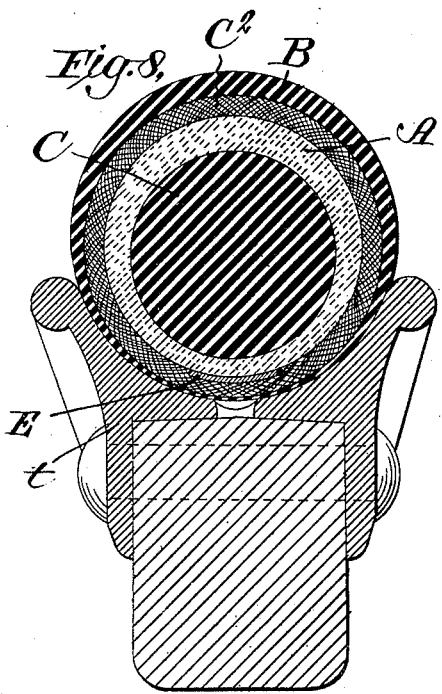
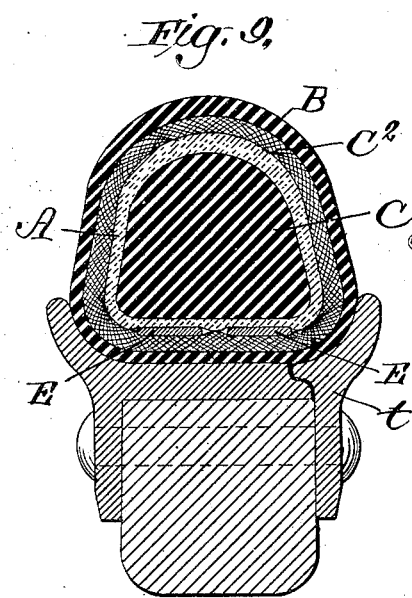
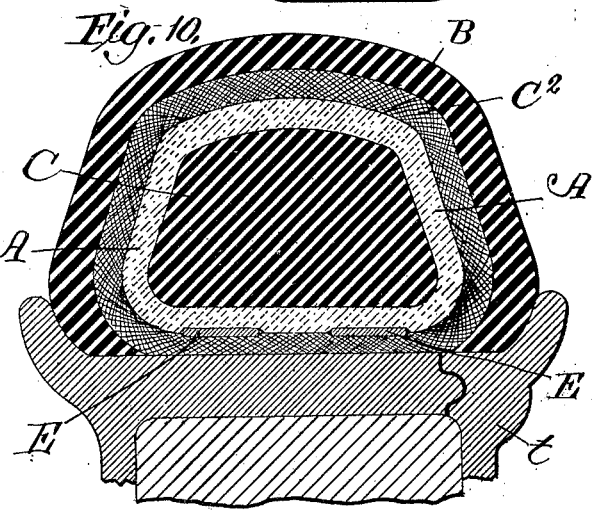
WITNESSES:
INVENTOR

UNITED STATES PATENT OFFICE.

ALBERT DE LASKI, OF WEEHAWKEN, NEW JERSEY.

VEHICLE-TIRE.

SPECIFICATION forming part of Letters Patent No. 675,064, dated May 28, 1901.

Application filed October 5, 1900. Serial No. 32,193. (No model.)

*To all whom it may concern:*

Be it known that I, ALBERT DE LASKI, a citizen of the United States, and a resident of 26 Third street, Weehawken, in the county of Hudson and State of New Jersey, have invented certain new and useful Improvements in Vehicle-Tires, of which the following is a specification.

My invention relates to tires, both solid and pneumatic, for automobiles and other vehicles, and has for its object, among other things, the production of a tire combining lightness, great strength, and durability. It is also intended to obviate the tendency which pneumatic tires in particular of this class have of pulling asunder when in service by reason of their numerous lap-joints, they being for the most part composed of numerous strips of duck "frictioned" with rubber compound and built up in layers spirally wound or otherwise; and my invention also has for its object the prevention of the overheating of the tire, caused by friction of its outer surface in contact with the road when the tire is rotating at a high rate of speed and by the constant agitation of the molecules of which the rubber compound is composed as it is rapidly deflected and bent and compressed when it comes in contact with the ground.

I will describe a tire embodying my invention and a modification thereof embraced in both pneumatic and solid tires and then point out the novel features thereof in the claims.

In the accompanying drawings, Figure 1 is a longitudinal section of a tire embodying my invention. Fig. 2 is a transverse section of same on line X' of Fig. 1, all but four of the numerous warp-threads composing a part of said tire being omitted for the sake of clearness. Figs. 3, 4, 5, and 6 are each elevations of a tire, showing the different steps in connecting together the ends of the tire, &c., prior to its being spirally wound with threads preparatory to its vulcanization. Figs. 7, 8, 9, and 10, corresponding with same, illustrate a variety of forms of pneumatic and solid tires in transverse section in which these tires may be made and also show means by which they may be secured to the wheels of vehicles.

Similar letters of reference designate corresponding parts in all of the figures.

The tire comprises a fabric tube A, a core C, (which may be in the form of a tube or a solid piece of rubber, as the case may be,) a metal binding strip or strips E, a spirally-wound cover of two or more plies composed of threads $C^2$, and a rubber cover B. The fabric tube A is cylindrically woven—that is, a circular loom is employed in its formation—and comprises the usual warp-threads A' and as many weft-threads $A^2$ as may be desired. In Fig. 2 the warp-threads A' have here been placed purposely wide apart for the sake of clearness. In practice they are placed close together and the interstices formed by them filled with rubber cement or compound, as shown at $A^3$, Fig. 1. In the drawings I have shown two weft-threads, which are spirally woven with the warp-threads. The warp-threads A' are of different diameters, according to the character of the fabric to be woven—that is to say, if the fabric be cylindrical, as shown in Fig. 2 and in Figs. 7 and 8, corresponding with same, those warps of the greatest diameter are arranged on one side of the "weaving-pin" (or solid-rubber core, as the case may be) about which the fabric is woven, or on that side of the fabric which will be used for the tread, and those warps of proportionately-decreasing diameter will be arranged on either side of the warps of greatest diameter. The warps of the smallest diameter will be arranged on the "tire" (rim) side of the fabric tube. With this arrangement as the fabric is woven) a curve will be given it due to the fact that there is more material on the tread side than on the rim side, consequently causing the said fabric to "build up" faster on the tread side as it is being woven than on the rim side. It will be seen, therefore, that a circular woven-tube may be produced for a wheel of any desired diameter. It will also be seen from Fig. 1 (indicated by the broken lines Z Z) that the weft-threads radiate from a center which is the center of the wheel to which the tire is to be fitted. Therefore with a given space for any single or initial warp-thread between two adjacent weft-threads the required diameters of each and all the other warp-threads can easily be ascertained for the production of a tire of any given diameter, as this distance between the weft-threads indicates the size of the warp-threads to fill this space. Should the tread portion of the tire be quite flat, or nearly so, as shown in Fig. 10, corresponding with same, at s, all of the warp-threads of this portion of the tire would be quite or nearly of one diameter and of one uniform length. Should this portion be curved, the warps would be of different diameters and different lengths. This principle of course also applies to the rim portion of the tire. The fabric tube thus formed may be chemically or otherwise treated to protect and preserve it against moisture, &c., or it may be treated with rubber solution for purposes of vulcanization. Preferably, however, it is proposed to treat all of the numerous threads, both warp and weft, which compose the fabric to a solution of rubber cement or compound before the fabric is woven. The threads thus treated are thoroughly dried before they are spooled preparatory to weaving, and are throughout impregnated with the compound. The advantage of this treatment of the threads or fabric is that when the tire is vulcanized the threads of the fabric are thoroughly united and the fabric will more firmly unite with the other component parts of the tire.

The tire is preferably made as follows: After a sufficient length of fabric has been woven the ends of the warp and weft threads are left long for the purpose of splicing the ends of the completed fabric. The ends may be spliced in any desired manner. The following is an example of one method: The rubber tube C, carrying a valve-nipple C', is drawn into (or is woven into, as preferred) the fabric and the ends united and cemented. The loose warp ends of one end of the fabric tube are then smoothed down and cemented to the tube, as shown at D, Fig. 5. The other end of the fabric is then brought forward and is drawn over the ends of the warps just cemented to the tube till the woven part comes in contact with the woven part of the cemented end. The weft-threads of the two ends are then spliced, and the loose warp ends are woven into the knitted fabric by hand or otherwise, as shown at D². This part of the tire now having been allowed to dry is then inflated with air under sufficient pressure to make it answer or serve the purpose of a mandrel. The metal endless binding-strip E is then placed within the ring thus formed and is firmly secured to the fabric by threads spirally wound around it and the fabric tube alternately right and left, as shown at C². In other words, there will be a layer or ply of threads wound about the metal strip and fabric tube with a pitch in one direction, and so on alternately until as many layers or plies are wound as desired, in practice a multiple number of threads in each layer being wound side by side at once and at a sharp "pitch." In practice these threads are preferably wound both ways (right and left) from opposite sides of the tire at one and the same time by suitable mechanism provided for the purpose; but it may also be done by hand. The object of this spirally-wound cover is threefold—namely, to strengthen the tire, secure the metal binding strip or strips, wire, or wires in place, and to counteract any tendency to elongation of the tire when in service. In practice these spirally-wound threads may or may not be treated with rubber cement or compound. Preferably it is intended to treat them in the same manner in which the woven fabric threads are treated, so that the whole mass of the tire may be vulcanized and firmly united. The outer rubber cover B is now put on, the tube deflated and recharged with wood-spirits or other suitable gas-generating fluid, and the whole vulcanized by any of the well-known processes, thus producing a strong and durable pneumatic tire with but a single joint in its entire make-up.

In making a solid and composite tire the fabric is woven directly onto the rubber core of the tire in the loom, the rubber core being first properly shaped or molded and semivulcanized for the purpose. This rubber core need not necessarily be circular in cross-section, but may be made in a variety of shapes suitably adapted to the purpose, the tubular fabric conforming to the shape of the core around which it is being woven and which in this case answers the purpose of a weaving-pin, formal, or mandrel. The rubber core thus having been covered with the fabric tube, the ends of the rubber core are then united by a lap-joint or otherwise and cemented. The two ends of the woven fabric are then spliced, as in the case of the pneumatic tire or in any suitable manner. The metal binding strip or strips, wire, or wires E, together with the several plies of spirally-wound covering and outer rubber wrapper, are then applied, as hereinabove described, and the tire is then ready for vulcanization in the mold. An ordinary circular loom for weaving hydraulic hose-pipes in which the warp-threads are "spooled" instead of "beamed" and fitted with suitable tension devices and suitable take-off mechanism adapted to the cross-sectional shape and the curvilinear feature of the tire may be employed for this purpose. It may here be observed that the ordinary "flat" hose-pipe loom is not suitable for this purpose, inasmuch as it is not adapted for weaving around a rubber tube or a solid core.

The fabric herein described is a plain weave. I wish it understood, however, that I do not confine myself to a plain fabric only, as it is evident the same results may be attained with a twill, &c., or a multiply fabric in which two or more fabrics in the process of weaving are united with a tie-thread. Neither do I confine myself to a fabric tube in which two weft-threads only are used, as a fabric of this description may be made on a loom having a single shuttle or a multiple number of shuttles.

As above noted, I here show in Figs. 7, 8, 9, and 10, corresponding with same, a variety of forms of suitably-divided metal rims for holding these tires in place on the wheel, (shown in sectional view.) In practice the outside or heavier part of these metal flanges may be shrunk onto the wheel or forced on by any suitable means. The rubber tire is then placed in position on this part of the flange, and the inside part of the metal flange or "follower" is then placed in position on the rim of the wheel and is secured by bolts or rivets.

What I claim as my invention is—

1. A tire comprising a fabric tube woven on a circular loom, enveloping a suitable core; a metal binding strip or strips secured thereto along the rim side thereof by layers of thread spirally wound alternately right and left and for the purpose of strengthening the fabric tube, said fabric tube having longitudinal or warp threads of greater diameter and greater length along the tread portion of the tire than along the rim portion of the tire as described.

2. A tire comprising a fabric tube woven on a circular loom enveloping a suitable core; a metal binding strip or strips secured thereto along the rim side thereof by covers of spirally-wound threads alternately wound in opposite directions for strengthening said fabric tube, and an outer rubber cover or envelop secured thereto inclosing the whole, substantially as described and for the purpose set forth.

3. A tire comprising a fabric tube woven on a circular loom, and in combination with an inner suitable core; a metal strip or strips, or wire or wires, a multiply spirally-wound cover of threads wound in opposite directions which alternate, and an outer cover of rubber; the whole united together with rubber cement or compound and vulcanized, as hereinbefore described and specified, and for the purpose set forth.

Signed at New York, in the county of New York and State of New York, this 29th day of September, A. D. 1900.

ALBERT DE LASKI.

Witnesses:
A. J. ZERBE,
C. F. DELANEY.